US008406210B2

United States Patent
Kim

(10) Patent No.: US 8,406,210 B2
(45) Date of Patent: Mar. 26, 2013

(54) APPARATUS AND METHOD FOR ALLOCATING RADIO NETWORK TEMPORARY IDENTIFIER FOR RANDOM ACCESS IN A MOBILE COMMUNICATION SYSTEM

(75) Inventor: Jung-Su Kim, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 454 days.

(21) Appl. No.: 12/728,540

(22) Filed: Mar. 22, 2010

(65) Prior Publication Data

US 2010/0238909 A1 Sep. 23, 2010

(30) Foreign Application Priority Data

Mar. 23, 2009 (KR) .................. 10-2009-0024551

(51) Int. Cl.
*H04J 3/00* (2006.01)
(52) U.S. Cl. .................. 370/345; 370/447; 370/461
(58) Field of Classification Search .......... None
See application file for complete search history.

(56) References Cited

U.S. PATENT DOCUMENTS

| 7,046,992 | B2 * | 5/2006 | Wallentin et al. ............. 455/411 |
| 2007/0258402 | A1 * | 11/2007 | Nakamata et al. ........... 370/329 |
| 2008/0212506 | A1 * | 9/2008 | Lee et al. .................... 370/310 |
| 2009/0196230 | A1 * | 8/2009 | Kim et al. ................... 370/328 |
| 2010/0124188 | A1 * | 5/2010 | Wu ............................... 370/328 |

* cited by examiner

*Primary Examiner* — Kwang B Yao
*Assistant Examiner* — Alex Skripnikov
(74) *Attorney, Agent, or Firm* — Jefferson IP Law LLP

(57) ABSTRACT

An apparatus and method for allocating Radio Network Temporary Identifiers (RNTIs) for random access in a mobile communication system are provided. An Evolved Node B (ENB) determines the number of RNTIs allocated to at least one User Equipment (UE) that transmitted a random access preamble, determines an average number of random access preambles received during a Transmission Time Interval (TTI), and sets a timer based on the number of allocated RNTIs and the average number of random access preambles. If a cell identifier corresponding to a first UE is not received from an upper layer before expiration of the timer, the ENB releases the RNTI allocated to the first UE, and allocates the released RNTI to a second UE different from the first UE.

20 Claims, 4 Drawing Sheets

APPARATUS AND METHOD FOR ALLOCATING RADIO NETWORK TEMPORARY IDENTIFIER FOR RANDOM ACCESS IN A MOBILE COMMUNICATION SYSTEM

PRIORITY

This application claims the benefit under 35 U.S.C. §119(a) of a Korean patent application filed in the Korean Intellectual Property Office on Mar. 23, 2009 and assigned Serial No. 10-2009-0024551, the entire disclosure of which is hereby incorporated by reference.

BACKGROUND OF THE INVENTION

1. Field of the Invention

The present invention relates to an apparatus and method for allocating Radio Network Temporary Identifiers (RNTIs) for random access in a mobile communication system. More particularly, the present invention relates to an apparatus and method for more efficiently allocating RNTIs in a mobile communication system.

2. Description of the Related Art

The Universal Mobile Telecommunication Service (UMTS) system is a 3rd Generation (3G) asynchronous mobile communication system that is based on Global System for Mobile communications (GSM) and General Packet Radio Services (GPRS), which are European mobile communication systems, and uses Wideband Code Division Multiple Access (WCDMA).

The Long Term Evolution (LTE) system is now under discussion as the next-generation mobile communication system of the UMTS system by the 3rd Generation Partnership Project (3GPP), which is in charge of UMTS standardization.

The LTE system is a technology for implementing high-speed packet-based communication at a transfer rate of up to 100 Mbps. To use the LTE technology, there have been discussed many different schemes including a scheme of reducing the number of nodes located in a communication path by simplifying the network configuration and a scheme of using as many radio protocols as possible in radio channels.

FIG. 1 illustrates a conventional configuration of a next-generation LTE mobile communication system.

Referring to FIG. 1, an Evolved UMTS Radio Access Network (E-UTRAN or E-RAN) 110 includes Evolved Node Bs (ENBs) 120, 122, 124, 126 and 128, and anchor nodes 130 and 132, which are upper nodes of the ENBs 120 to 128. A User Equipment (UE) 101 accesses an Internet Protocol (IP) network 114 by means of the E-UTRAN 110.

The ENBs 120 to 128 correspond to the legacy Node Bs of the UMTS system, and are connected to the UE 101 through a radio channel. The ENBs 120 to 128 take charge of more complex functions as compared with the legacy Node Bs. For example, in LTE, as all user traffic, including real-time services such as IP-based Voice over IP (VoIP), is serviced through a shared channel, the ENBs 120 to 128 perform scheduling by collecting status information of UEs and perform functions related to radio resource management.

The ENBs 120 to 128 each include a control protocol, such as Radio Resource Control (RRC), and generally control multiple cells.

A random access process is performed between a UE, which is in an RRC idle mode or an RRC connected mode, and an ENB, which is in a network node.

During a conventional random access process, the UE performs uplink timing synchronization with the ENB for (initial) uplink message/data transmission, sets initial uplink transmit power, or transmits a request for radio resource allocation for the (initial) uplink message/data transmission to the ENB.

When the UE is in the RRC idle mode, an anchor node or an upper node of the ENB, rather than the ENB itself, manages a location of the UE. The anchor node or upper node manages the location of the UE not on a cell basis but on a tracking area basis for paging, using context information of the UE.

If both the anchor node and the ENB set up an RRC connection between the UE and the ENB using the context information of the UE, the UE enters the RRC connected mode. Then, the ENB manages the location of the UE that has entered the RRC connected node on a cell basis.

FIG. 2 is a signal flow diagram illustrating a conventional random access process.

Referring to FIG. 2, in step 221, a UE 210 triggers a random access process with an ENB 211. For example, the UE 210 may perform the triggering in the RRC idle mode to inform the ENB 211 of the necessity of transmitting an uplink control message to start call setup.

The uplink control message is used to allow the ENB 211 to perform an operation of setting up an RRC connection to the UE 210 using context information of the UE 210 and transmitting a service request to an anchor node.

In step 231, the UE 210 randomly selects one of N preset random access preambles for transmission to the ENB 211. In step 241, the UE 210 transmits the selected random access preamble to the ENB 211 by using a preset Random Access Channel (RACH) for a predetermined time.

In step 242, the ENB 211 transmits the UE 210 a response message to the random access preamble received in step 241. To be more specific, the ENB 211 checks the random access preamble received from the UE 210, and allocates a Temporary Cell Radio Network Temporary Identifier (Temp_C_RNTI) to the UE 210. Although not illustrated, the ENB 211 respectively allocates a Temp_C_RNTI to each of multiple UEs to temporarily distinguish the multiple UEs that have transmitted a random access preamble, including the UE 210.

The Temp_C_RNTI that is allocated to the UE 210 is transmitted to the UE 210. Furthermore, although not illustrated, other Temp_C_RNTIs, that are respectively allocated to other UEs that have transmitted random access preambles, are transmitted to the other UEs. The Temp_C_RNTIs, including the Temp_C_RNTI transmitted to the UE 210, are transmitted over a physical downlink shared channel. The ENB 211 transmits radio resource allocation information for transmission of an uplink message to the UEs, together with the Temp_C_RNTI.

In step 251, the UE 210 checks the allocated Temp_C_RNTI, and transmits an RRC connection request message to the ENB 211 based on the allocated radio resource information. The RRC connection request message is forwarded to an RRC layer 212 with a control protocol for call setup control of the UE 210.

In step 253, the RRC layer 212 checks the Temp_C_RNTI and a channel status of the UE 210, and, if a call setup request condition is satisfied, the RRC layer 212 transmits a UE (call) setup response message to the ENB 211, thus completing the call setup. The RRC layer 212 uses the Temp_C_RNTI as a Cell Radio Network Temporary Identifier (C_RNTI) to distinguish multiple call setup-completed UEs in the cell.

In step 254, upon receiving the UE setup response message from the RRC layer 212, the ENB 211 uses the Temp_C_RNTI allocated to the UE 210 as a C_RNTI. In the future, the ENB 211 manages the UE 210 using the C_RNTI.

The ENB 211 should continuously store and manage the allocated Temp_C_RNTI until it receives the UE setup response message from the RRC layer 212.

In implementation of the above described system, however, the number of identifiers the ENB 211 can use to identify multiple UEs, that is, the number of Temp_C_RNTIs, is limited.

Accordingly, when the number of UEs simultaneously attempting to access the ENB 211 exceeds the number of available Temp_C_RNTIs, the ENB 211 may not allocate Temp_C_RNTIs to all of the UEs attempting the access. That is, because of the limited number of resources for allocating Temp_C_RNTIs, the ENB 211 may be unable to continuously allocate Temp_C_RNTIs.

An inefficiency of the above described system is that the ENB 211 continuously allocates a Temp_C_RNTI for a particular UE even when no RRC connection is set up between the UE 210 and the ENB 211 or when the ENB 211 has not received a UE setup response message from the RRC layer 212.

Therefore, a method for efficiently using the limited number of Temp_C_RNTIs is needed. In other words, there is a demand for a method of more efficiently allocating Temp_C_RNTIs taking the current resource allocation of the ENB into consideration. In addition, a more efficient random access method for addressing such problems is needed in a mobile communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and method for efficiently performing random access in a mobile communication system.

Another aspect of the present invention is to provide an apparatus and method for more efficiently allocating a Radio Network Temporary Identifier (RNTI) to a User Equipment (UE) by an Evolved Node B (ENB) during a random access process.

Still another aspect of the present invention is to provide an apparatus and method in which an ENB reuses an RNTI it allocated to a particular UE for another UE during a random access process.

Yet another aspect of the present invention is to provide an apparatus and method in which an ENB allocates an RNTI to a UE taking into account the cell condition at the time the UE requests call setup.

In accordance with an aspect of the present invention, a method for allocating RNTIs for random access by an ENB in a mobile communication system is provided. The method includes determining the number of RNTIs allocated to at least one UE that transmitted a random access preamble, determining an average number of random access preambles received during a Transmission Time Interval (TTI), setting a timer based on the number of allocated RNTIs and the average number of random access preambles, releasing an RNTI allocated to a first UE if a cell identifier corresponding to the first UE is not received from an upper layer before expiration of the timer, and allocating the released RNTI to a second UE different from the first UE.

In accordance with another aspect of the present invention, an ENB apparatus for allocating RNTIs for random access in a mobile communication system is provided. The ENB apparatus includes an RNTI allocator for determining the number of RNTIs allocated to at least one UE that transmitted a random access preamble, for determining an average number of random access preambles received during a TTI, for setting a timer based on the number of allocated RNTIs and the average number of random access preambles, for releasing an RNTI allocated to a first UE if a cell identifier corresponding to the first UE is not received from an upper layer before expiration of the timer, and for allocating the released RNTI to a second UE different from the first UE, and the timer for running for a time set by the RNTI allocator.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

Figure 1:
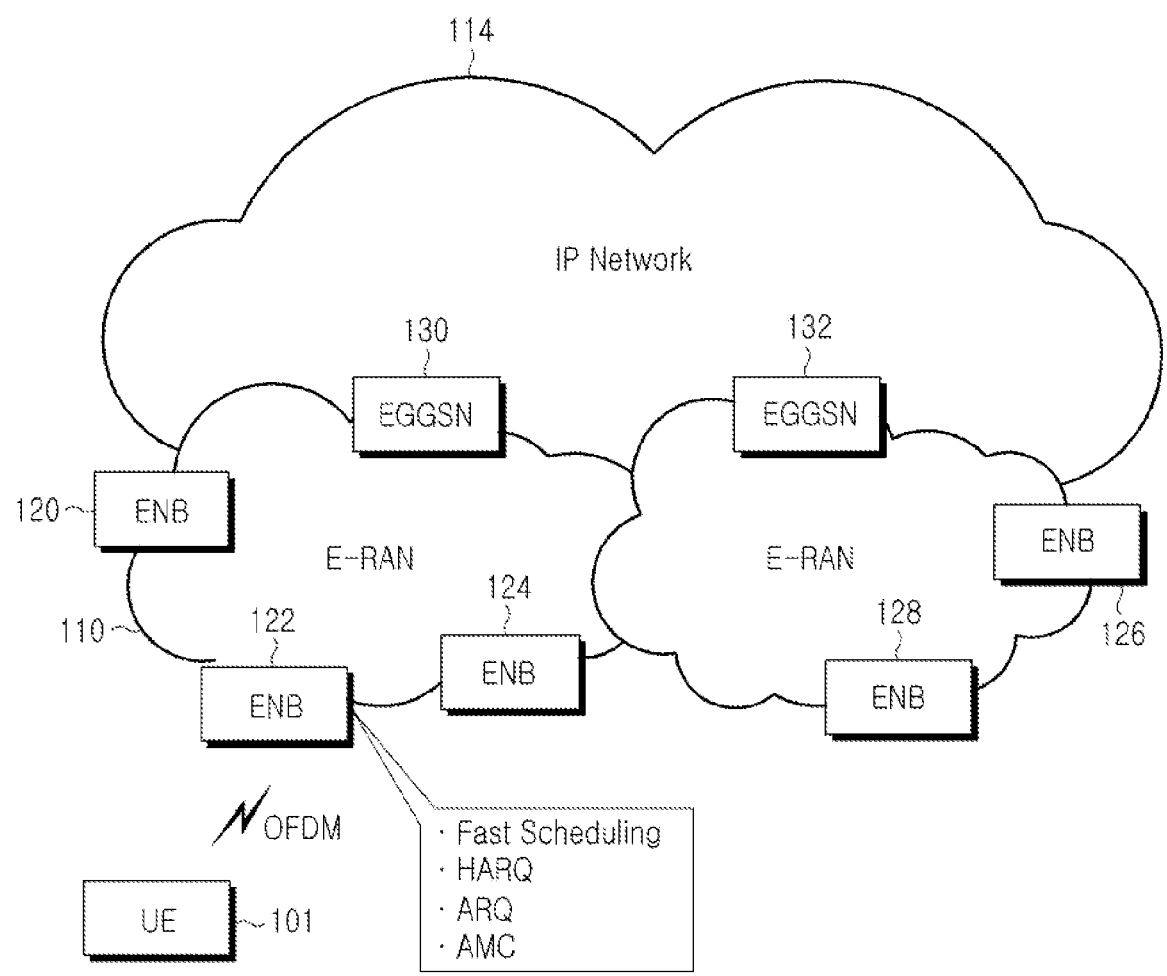
FIG. 1 illustrates a conventional configuration of a next-generation Long Term Evolution (LTE) mobile communication system.
Figure 2:
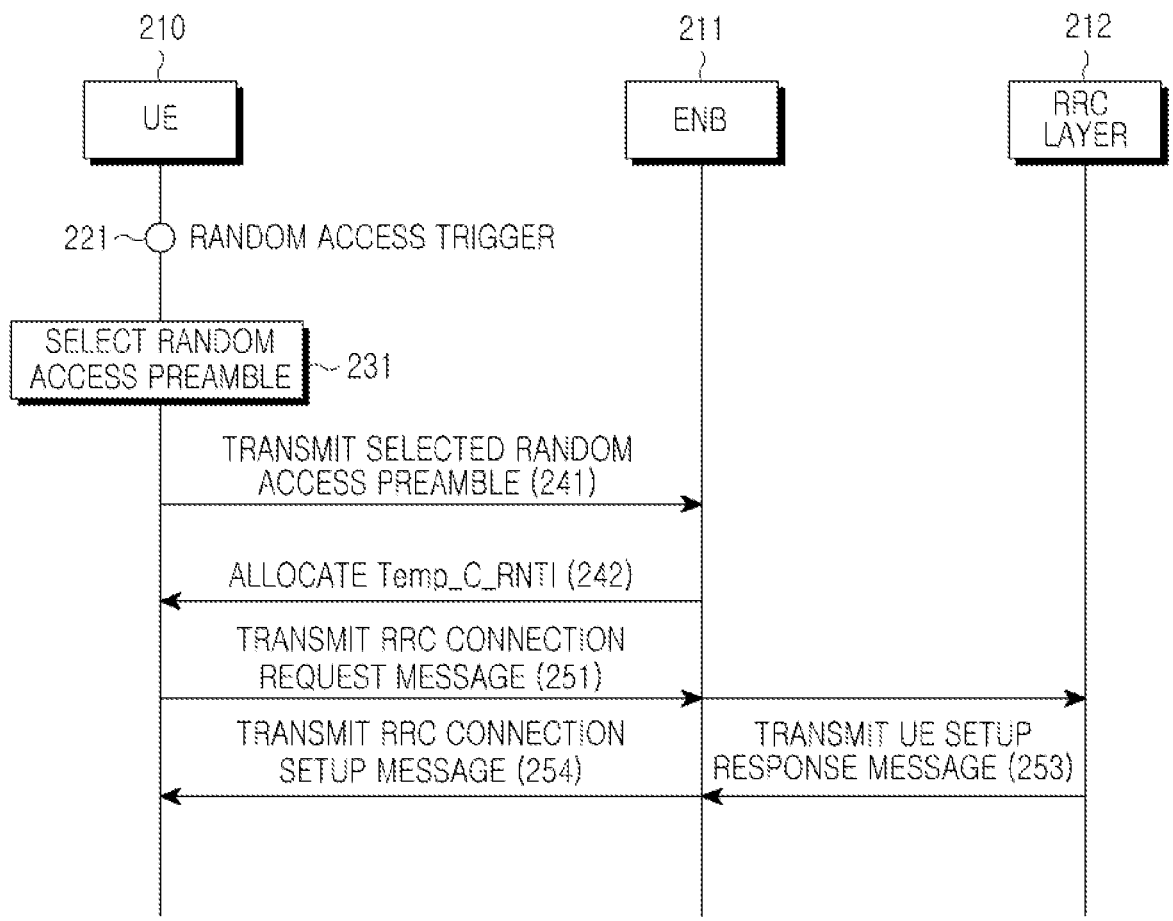
FIG. 2 is a signal flow diagram illustrating a conventional random access process.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide an apparatus and method for allocating temporary Radio Network Temporary Identifiers (RNTIs) for random access.

It is considered herein that the mobile communication system described in this specification is a 3rd Generation Partnership Project (3GPP) Long Term Evolution (LTE) system that has evolved from the 3GPP system. However, the present invention may be applied to any mobile communication system in which Evolved Node B (ENB) scheduling is used, any mobile communication system in which a random access process is performed, or any mobile communication system supporting uplink services.

Exemplary embodiments of the present invention define a Temporary Cell Radio Network Temporary Identifier (Temp_C_RNTI) or a Cell Radio Network Temporary Identifier (C_RNTI) as an example of an RNTI used to distinguish multiple User Equipments (UEs). The C_RNTI is an RNTI for identifying a UE within at least one cell managed by an ENB, and the Temp_C_RNTI is an RNTI for identifying a UE in a routing area during a random access procedure.

According to an exemplary embodiment of the present invention, when an ENB does not receive a UE setup response message from a Radio Resource Control (RRC) layer before expiration of a time period (hereinafter referred to as an "RNTI management time") that is set to efficiently manage Temp_C_RNTIs, the ENB releases a Temp_C_RNTI allocated to a particular UE and reallocates the released Temp_C_RNTI to another UE.

Figure 3:
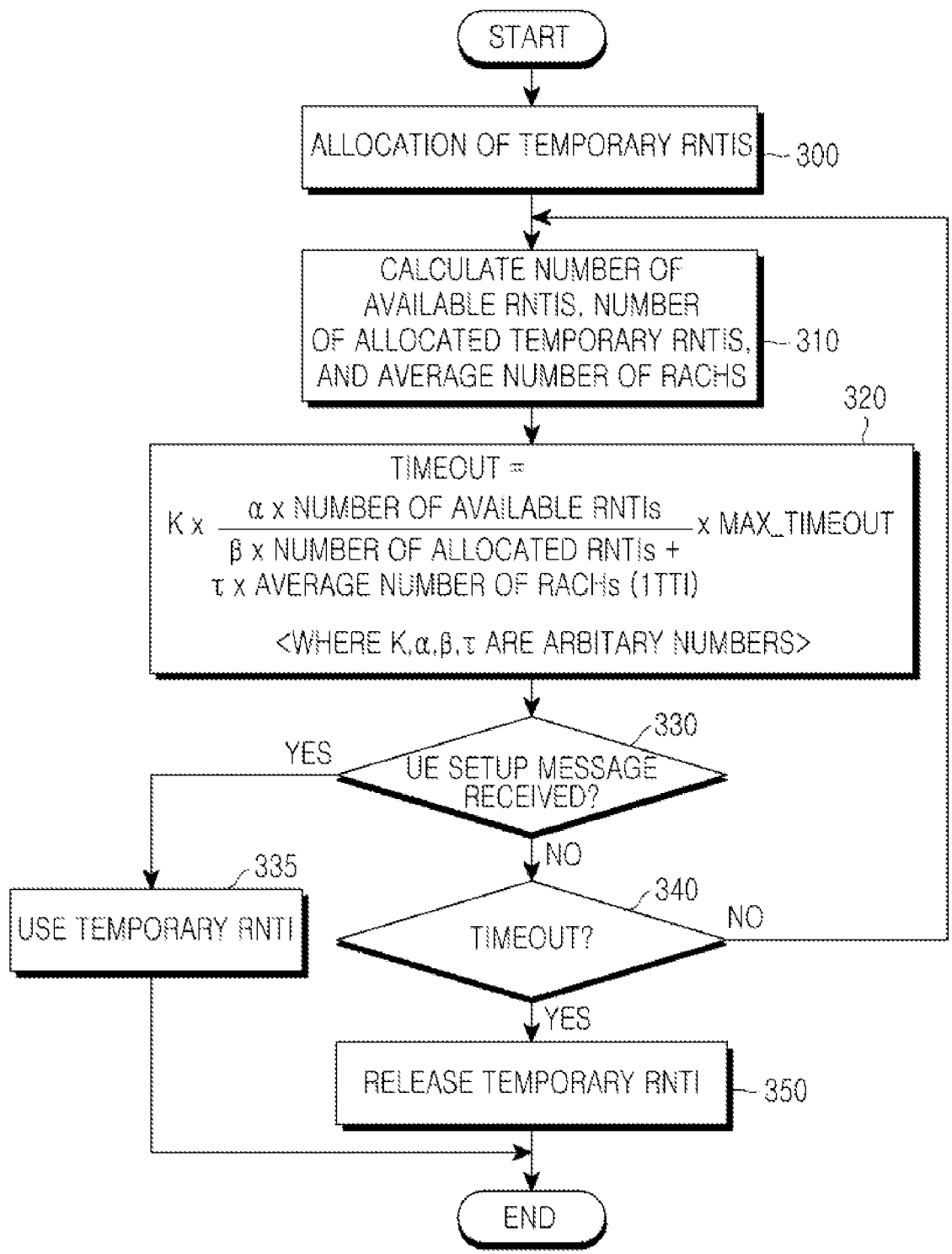
FIG. 3 is a flowchart illustrating a process of allocating Radio Network Temporary Identifiers (RNTIs) by an Evolved Node B (ENB) according to an exemplary embodiment of the present invention.

FIG. 3 is a flowchart illustrating a process of allocating RNTIs by an ENB according to an exemplary embodiment of the present invention.

Referring to FIG. 3, in step 300, an ENB allocates temporary RNTIs for respective UEs. The allocated temporary RNTIs are for distinguishing UEs that transmitted a random access preamble in a service area. Regarding the system configuration, the ENB controls at least one cell, and manages a service area of the at least one cell where at least one UE is located. Furthermore, transmission by the UE of a random access preamble is made on a Random Access Channel (RACH).

The temporary RNTI may include all RNTIs used by a UE, including a Temp_C_RNTI, a Semi-Persistent (SPS)_RNTI, a Transmit Power Control (TPC)_RNTI, etc.

The ENB includes the temporary RNTI to be allocated to a respective UE and radio resource information in a RACH response message, which is a response to the random access preamble, and transmits the RACH response message to the UE.

In step 310, the ENB determines the number of available RNTIs, the number of allocated temporary RNTIs, and the number of UEs that transmitted a random access preamble, i.e., the average number (hereinafter, referred to as "the average number of RACHs") of random access preambles received over an RACH for one Transmission Time Interval (TTI).

In an exemplary implementation, the number of available RNTIs can be determined by subtracting the number of RNTIs in use and the number of allocated temporary RNTIs from the total number of RNTIs.

In step 320, the ENB sets a timer for release and reuse of allocated temporary RNTIs. More specifically, the ENB determines a Timeout value which indicates the amount of time before an allocated temporary RNTI is released for reuse. The timer is activated and reflects an RNTI management time for efficiently managing the limited number of temporary RNTIs. The RNTI management time (i.e., Timeout) is set in accordance with Equation (1) below.

$$\text{Timeout} = K \times \frac{\alpha \times \text{Number of Available RNTIs}}{\beta \times \text{Number of Allocated RNTIs} + \tau \times \text{Average Number of RACHs}(1TTI)} \times \text{Max\_Timeout} \quad (1)$$

In Equation (1), Number of Allocated RNTIs represents a sum of the number of RNTIs in use and the number of allocated temporary RNTIs, and Max_Timeout represents the maximum use time which is set by the ENB and during which allocated temporary RNTIs can be used. Further, K represents an arbitrary number, $\alpha$ represents a weight for available RNTIs, $\beta$ represents a weight for allocated RNTIs, and $\tau$ represents a weight for the average number of RACHs. Here, $\alpha$, $\beta$ and $\tau$ are subject to change according to the service area or the service time.

For example, when one day is considered, a call setup request from a UE may increase from 7 a.m. to 10 a.m., and the UE's call setup request may decrease from 11 p.m. to 6 a.m. the next day. In addition, on special days such as Christmas and New Year's Day, the UE's call setup request may abruptly increase compared with ordinary days.

Therefore, $\alpha$, $\beta$ and $\tau$ are set as weights corresponding to the time the UE transmits a call setup request.

Accordingly, the Timeout value may be set in consideration of the time-dependent cell environment. In such an exemplary implementation, temporary RNTIs may be more efficiently allocated based on the set Timeout value.

In another exemplary implementation, the Timeout value may decrease in inverse proportion to the number of allocated RNTIs and the average number of RACHs per TTI.

That is, if the number of presently allocated temporary RNTIs is greater than or equal to a threshold, the ENB decreases the Timeout value, determining that the number of available temporary RNTIs may be insufficient. Furthermore, if the average number of RACHs is greater than or equal to a threshold, the ENB reduces the Timeout value because it should allocate more temporary RNTIs.

In step 330, the ENB determines whether UE call setup for a particular UE to which the temporary RNTI is allocated has been completed. That is, the ENB determines whether it has received a UE setup response message from an RRC layer or another of its upper layers.

If it is determined in step 330 that the ENB has received the UE setup response message, the ENB permits in step 335 the use of the temporary RNTI of the UE so that the UE may continuously use the allocated temporary RNTI. Accordingly, the UE may use a Temp_C_RNTI as a C_RNTI, when the temporary RNTI is the Temp_C_RNTI.

However, if it is determined in step 330 that the ENB has not received the UE setup response message from the RRC, the ENB determines in step 340 whether the time for which it has waited for the UE setup response message has exceeded the Timeout value.

If the ENB determines in step 340 that the time for which it has waited for the UE setup response message has exceeded the Timeout value, in step 350 the ENB releases the temporary RNTI allocated to the UE in order to reallocate the released temporary RNTI to another UE.

On the other hand, if the ENB determines in step 340 that the time for which it has waited for the UE setup response message has not exceeded the Timeout value, the ENB returns to step 310 and repeats the succeeding steps.

Figure 4:
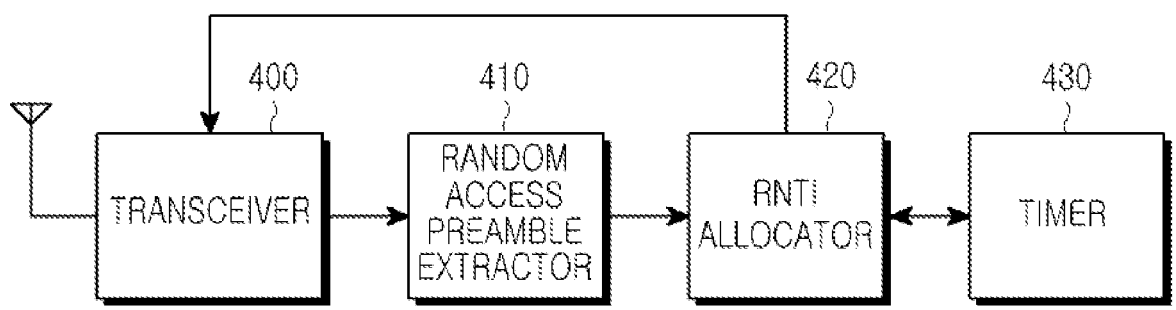
FIG. 4 is a block diagram of an ENB performing a random access process according to an exemplary embodiment of the present invention.

FIG. 4 illustrates a structure of an ENB for performing a random access process according to an exemplary embodiment of the present invention.

Referring to FIG. 4, the ENB includes a transceiver 400, a random access preamble extractor 410, an RNTI allocator 420, and a timer 430.

The transceiver 400 receives an RACH signal from a UE. In response to the RACH signal received from the UE, the transceiver transmits the UE an RACH response message including a temporary RNTI allocated according to a random access preamble. Further, the transceiver 400 receives a call setup request message with the allocated temporary RNTI from the UE, and transmits the UE a UE setup response message with the RNTI received from an RRC layer in response to the call setup request message.

The random access preamble extractor 410 extracts a random access preamble selected by the UE from the received RACH signal.

The RNTI allocator 420 checks a radio channel condition of the UE using the random access preamble extracted by the random access preamble extractor 410, and allocates an appropriate radio resource to the UE considering the UE's radio channel condition. The RNTI allocator 420 allocates temporary RNTIs for distinguishing multiple UEs in a service area to the multiple UEs.

According to an exemplary embodiment of the present invention, the RNTI allocator 420 determines the number of available RNTIs, the number of allocated temporary RNTIs, and the number of extracted random access preambles, and sets a time (i.e., a Timeout value) at which an RNTI management time for managing the allocated temporary RNTIs expires. Therefore, the RNTI allocator 420 permits the UE's use of the allocated temporary RNTI for an RNTI management time by activating the timer 430, or releases or reallocates the allocated temporary RNTI.

In an exemplary implementation, when the number of the currently allocated temporary RNTIs is greater than or equal to a threshold, the RNTI allocator 420 decreases the RNTI management time because the number of available temporary RNTIs is insufficient.

In another exemplary implementation, if the average number of RACHs is greater than or equal to a threshold, the RNTI allocator 420 reduces the RNTI management time for the UEs requesting allocation of temporary RNTIs.

As described above, during the random access process according to an exemplary embodiment of the present invention, the ENB, especially the RNTI allocator 420, permits the use of a temporary RNTI allocated to a particular UE for a predetermined time, and reallocates the temporary RNTI allocated to the particular UE to another UE requesting random access, if the call setup for the particular UE is not completed.

The RNTI allocator 420 sets a time for use of the temporary RNTI taking into account the number of UEs requesting random access in the cell and the number of allocated RNTIs. That is, if the number of UEs presently attempting call connection is less than a threshold, the RNTI allocator 420 increases the Timeout value of the timer 430 so that the ENB may wait for a UE setup response message for a longer time. On the other hand, if the number of allocable temporary RNTIs is insufficient as the number of UEs desiring call connection is greater than a threshold, then the RNTI allocator 420 reduces the Timeout value of the timer 430 so that the allocated temporary RNTI may be released faster.

As is apparent from the foregoing description, according to an exemplary embodiment of the present invention, the ENB permits a particular UE to use an RNTI during a time determined depending on the number of random access preambles received in a cell and the number of RNTIs allocated to the UE in the mobile communication system, thereby increasing the random access capacity.

In addition, the ENB can more efficiently use the limited RNTIs, enabling a random access process for multiple UEs.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for allocating Radio Network Temporary Identifiers (RNTIs) for random access by an Evolved Node B (ENB) in a mobile communication system, the method comprising:

determining, by the ENB, a number of RNTIs allocated to at least one User Equipment (UE) that transmitted a random access preamble;

determining, by the ENB, an average number of random access preambles received during a Transmission Time Interval (TTI);

setting, by the ENB, a timer based on the number of allocated RNTIs and the average number of random access preambles;

releasing, by the ENB, an RNTI allocated to a first UE if a cell identifier corresponding to the first UE is not received from an upper layer before expiration of the timer; and allocating, by the ENB, the released RNTI to a second UE different from the first UE.

2. The method of claim 1, wherein the setting of the timer comprises setting, by the ENB, the timer using a weight that is determined according to a number of UEs requesting call setup using an RNTI allocated to the at least one UE.

3. The method of claim 1, wherein the setting of the timer comprises setting, by the ENB, the timer using a weight that is determined according to the number of RNTIs allocated to the at least one UE.

4. The method of claim 1, wherein the setting of the timer comprises setting, by the ENB, the timer in inverse proportion to at least one of the number of RNTIs allocated to the at least one UE and the average number of random access preambles.

5. The method of claim 1, further comprising:

determining, by the ENB, a number of available RNTIs, wherein the setting of the timer comprises setting, by the ENB, the timer based on the number of allocated RNTIs, the average number of random access preambles, and the number of available RNTIs.

6. The method of claim 5, wherein the setting of the timer comprises setting, by the ENB, the timer using a weight that is determined according to the number of available RNTIs.

7. The method of claim 5, wherein the setting of the timer comprises setting, by the ENB, the timer in proportion to the number of available RNTIs.

8. The method of claim 1, wherein the determining of the number of RNTIs allocated to the at least one UE comprises determining, the ENB, the number of RNTIs that are allocated to the at least one UE and not in use, and the number of RNTIs that are allocated to the at least one UE and in use.

9. The method of claim 1, further comprising decreasing, by the ENB, the setting of the timer if at least one of the number of RNTIs allocated to the at least one UE is greater than a first threshold and the number of random access preambles received for the TTI is greater than a second threshold.

10. The method of claim 1, wherein the setting of the timer comprises setting, by the ENB, the timer using the following equation, $$\text{Timeout} = K \times \frac{\alpha \times \text{Number of Available RNTIs}}{\beta \times \text{Number of Allocated RNTIs} + \tau \times \text{Average Number of RACHs}(1TTI)} \times \text{Max\_Timeout}$$

where Number of Allocated RNTIs represents the number of RNTIs allocated to the at least one UE, Average Number of RACHs represents the average number of random access preambles received for one TTI, Number of Available RNTIs represents the number of available RNTIs, Max_Timeout represents the maximum use time for which the RNTI allocated to the at least one UE can be used, K represents an arbitrary number, α represents a weight for the available RNTIs, β represents a weight for the RNTI allocated to the at least one UE, and τ represents a weight for the average number of Random Access Channels (RACHs).

11. An Evolved Node B (ENB) apparatus for allocating Radio Network Temporary Identifiers (RNTIs) for random access in a mobile communication system, the apparatus comprising:
   an RNTI allocator for determining a number of RNTIs allocated to at least one User Equipment (UE) that transmitted a random access preamble, for determining an average number of random access preambles received for a Transmission Time Interval (TTI), for setting a timer based on the number of allocated RNTIs and the average number of random access preambles, for releasing an RNTI allocated to a first UE if a cell identifier corresponding to the first UE is not received from an upper layer before expiration of the timer, and for allocating the released RNTI to a second UE different from the first UE; and
   the timer for running for a time set by the RNTI allocator.

12. The apparatus of claim 11, wherein the RNTI allocator sets the timer using a weight that is determined according to a number of UEs requesting call setup using an RNTI allocated to the at least one UE.

13. The apparatus of claim 11, wherein the RNTI allocator sets the timer using a weight that is determined according to the number of RNTIs allocated to the at least one UE.

14. The apparatus of claim 11, wherein the RNTI allocator sets the timer in inverse proportion to at least one of the number of RNTIs allocated to the at least one UE and the average number of random access preambles.

15. The apparatus of claim 11, wherein the RNTI allocator determines a number of available RNTIs, and sets the timer based on the number of allocated RNTIs, the average number of random access preambles, and the number of available RNTIs.

16. The apparatus of claim 15, wherein the RNTI allocator sets the timer using a weight that is determined according to the number of available RNTIs.

17. The apparatus of claim 15, wherein the RNTI allocator sets the timer in proportion to the number of available RNTIs.

18. The apparatus of claim 11, wherein the RNTI allocator determines the number of RNTIs allocated to the at least one UE and not in use, and the number of RNTIs that are allocated to the at least one UE and in use.

19. The apparatus of claim 11, wherein the RNTI allocator decreases the setting of the timer if at least one of the number of RNTIs allocated to the at least one UE is greater than a first threshold and the number of random access preambles received for the TTI is greater than a second threshold.

20. The apparatus of claim 11, wherein the RNTI allocator sets the timer using the following equation, $$\text{Timeout} = K \times \frac{\alpha \times \text{Number of Available RNTIs}}{\beta \times \text{Number of Allocated RNTIs} + \tau \times \text{Average Number of RACHs}(1TTI)} \times \text{Max\_Timeout}$$

where Number of Allocated RNTIs represents the number of RNTIs allocated to the at least one UE, Average Number of RACHs represents the average number of random access preambles received for one TTI, Number of Available RNTIs represents the number of available RNTIs, Max_Timeout represents the maximum use time for which the RNTI allocated to the at least one UE can be used, K represents an arbitrary number, α represents a weight for the available RNTIs, β represents a weight for the RNTI allocated to the at least one UE, and τ represents a weight for the average number of Random Access Channels (RACHs).

* * * * *